(12) United States Patent
K et al.

(10) Patent No.: US 12,530,248 B2
(45) Date of Patent: Jan. 20, 2026

(54) SYSTEMS AND METHODS FOR REDUCING BOOT UP LATENCY IN SYSTEMS THAT RUN AUTOMOTIVE OPERATING SYSTEMS

(71) Applicant: QUALCOMM INCORPORATED, San Diego, CA (US)

(72) Inventors: Anirudh K, Nalagonda (IN); Madhu Yashwanth Boenapalli, Telangana (IN); Sai Praneeth Sreeram, Anantapur (IN); Surendra Paravada, Telangana (IN); Venugopala Rao Gujja, Telangana (IN)

(73) Assignee: QUALCOMM Incorporated, San Diego, CA (US)

( * ) Notice: Subject to any disclaimer, the term of this patent is extended or adjusted under 35 U.S.C. 154(b) by 121 days.

(21) Appl. No.: 18/466,186

(22) Filed: Sep. 13, 2023

(65) Prior Publication Data

US 2025/0086037 A1    Mar. 13, 2025

(51) Int. Cl.
*G06F 11/07* (2006.01)
*G06F 11/14* (2006.01)

(52) U.S. Cl.
CPC ...... *G06F 11/0739* (2013.01); *G06F 11/0793* (2013.01); *G06F 11/1448* (2013.01)

(58) Field of Classification Search
CPC ............. G06F 11/0739; G06F 11/0793; G06F 11/1448
See application file for complete search history.

(56) References Cited

U.S. PATENT DOCUMENTS 9,336,068 B2 * 5/2016 Parker ............... G06F 9/542
10,649,889 B2 * 5/2020 Desai ................ G06F 12/023
2007/0038850 A1 * 2/2007 Matthews ......... G06F 9/4401 713/1
2023/0014569 A1 * 1/2023 Luban ............... G06F 1/324
2023/0023461 A1 * 1/2023 Shi .................. G06F 9/4418

OTHER PUBLICATIONS

International Search Report and Written Opinion—PCT/US2024/044089—ISA/EPO—Dec. 2, 2024.
Wang W., et al., "A Zero-Energy Consumption Scheme for System Suspend to Limited NVM", 9th Non-volatile Memory-systems and Applications Symposium (NVMSA), IEEE, Aug. 19, 2020, 6 Pages, XP033821739, p. 1-p. 6.

* cited by examiner

*Primary Examiner* — Michael Maskulinski
*Assistant Examiner* — Kayo Lisa Rusin
(74) *Attorney, Agent, or Firm* — Smith Tempel Blaha LLC (57) ABSTRACT

A system and method reduce bootup latency in systems that run Auto operating systems (Auto OS). When, or just prior to, the system controller initiating suspend-to-disk (S2D) process entry, the system controller causes a memory controller to determine the percentage of volatile memory that is currently occupied and compares that percentage of occupancy to a predetermined threshold (TH) percentage. If the percentage of occupancy exceeds the predetermined TH percentage, then the memory controller tags apps that are occupying volatile memory as either background apps or foreground apps, terminates the background apps, clears volatile memory of any instructions and data associated with the terminated background apps, takes a snapshot of the state of volatile memory after the terminated background apps and associated data have been cleared, and saves the snapshot to a designated storage location in nonvolatile memory before entering hibernate mode.

30 Claims, 6 Drawing Sheets

SYSTEMS AND METHODS FOR REDUCING BOOT UP LATENCY IN SYSTEMS THAT RUN AUTOMOTIVE OPERATING SYSTEMS

DESCRIPTION OF THE RELATED ART

Computing devices and their components may experience operational failures, possibly leading to undesirable outcomes. One of the key underpinnings of an automated driving system is its ability to continue to stay operational while electrical/electronic (E/E) faults or other failures in software have been detected by the Advanced Driver Assistance System (ADAS) or automated driving system (ADS), referred to hereinafter as ADAS/ADS systems.

An electronic control unit (ECU) is the heart of ADAS/ADS systems and fuses together large amounts of information about the surrounding environment acquired from various sensors, such as stereo cameras, optical sensors, navigation and other sensors to perform a complex and computationally intense problem that is critical to ensuring the availability of the system while continuously detecting and managing faults during mission mode.

ADAS/ADS systems often run an Automotive Operating System (Auto OS) that acts as an infotainment platform onto which drivers can download compatible apps that can be used by the driver when operating the vehicle. The driver can manage the apps using a graphical user interface (GUI) of the vehicle.

SUMMARY OF THE DISCLOSURE

Systems, methods, and other examples are disclosed for reducing latency in rebooting a system that runs an Auto OS.

An exemplary embodiment of the method comprises:
before performing a suspend-to-disk (S2D) process, determining whether or not an amount of storage space of a volatile memory device of the system that is currently in use exceeds a preselected threshold (TH) value;
if the amount of storage space of the volatile memory device of the system that is currently in use exceeds the preselected TH value, selecting one or more computer programs that are stored in the volatile memory device for termination, terminating the selected one or more computer programs, and clearing the volatile memory device of the selected one or more computer programs and of data associated with the selected one or more computer programs; and
after deleting the selected one or more computer programs and data associated with the selected one or more computer programs from the volatile memory device, performing the S2D process.

An exemplary embodiment of the system comprises a memory controller comprising:
logic configured to determine, before performing an S2D process, whether or not an amount of storage space of a volatile memory device of the system that is currently in use exceeds a preselected TH value;
logic configured to select one or more computer programs that are stored in the volatile memory device for termination if the amount of storage space of the volatile memory device of the system that is currently in use exceeds the preselected TH value;
logic configured to terminate the selected one or more computer programs and to delete the selected one or more computer programs and data associated with the selected one or more computer programs from the volatile memory device; and
logic configured to perform the S2D process after deleting the selected one or more computer programs and data associated with the selected one or more computer programs from the volatile memory device.

An exemplary embodiment of a computer program reducing latency in rebooting a system that runs an Auto OS is embodied on a non-transitory computer readable medium and comprises:
a first set of computer instructions for determining, before performing an S2D process, whether or not an amount of storage space of a volatile memory device of the system that is currently in use exceeds a preselected TH value;
a second set of computer instructions for selecting one or more computer programs that are stored in the volatile memory device for termination if the amount of storage space of the volatile memory device of the system that is currently in use exceeds the preselected TH value;
a third set of computer instructions for terminating the selected one or more computer programs and deleting the selected one or more computer programs and data associated with the selected one or more computer programs from the volatile memory device; and
a fourth set of computer instructions for performing the S2D process after deleting the selected one or more computer programs and data associated with the selected one or more computer programs from the volatile memory device.

Another exemplary embodiment of the system reducing latency in rebooting a system that runs an Auto OS comprises:
means for determining, before performing an S2D process, whether or not an amount of storage space of a volatile memory device of the system that is currently in use exceeds a preselected TH value;
means for selecting one or more computer programs that are stored in the volatile memory device for termination if the amount of storage space of the volatile memory device of the system that is currently in use exceeds the preselected TH value;
means for terminating the selected one or more computer programs and for deleting the selected one or more computer programs and data associated with the selected one or more computer programs from the volatile memory device; and
means for performing the S2D process after deleting the selected one or more computer programs and data associated with the selected one or more computer programs from the volatile memory device.

These and other features and advantages will become apparent from the following description, drawings and claims.

BRIEF DESCRIPTION OF THE DRAWINGS

In the Figures, like reference numerals refer to like parts throughout the various views unless otherwise indicated.

DETAILED DESCRIPTION

Currently, when a driver turns off the vehicle, a motion control unit (MCU) of the ADAS/ADS system senses the condition and causes the ADAS/ADS system to enter a hibernate mode in which Auto OS runs a suspend-to-disk (S2D) process. The S2D process takes a snapshot of volatile memory, i.e., a snapshot of the state of the computer instructions and data that are currently occupying volatile memory. The volatile memory device may be, for example, Double Data Rate Synchronous Dynamic Random Access Memory (DDR SRAM). The S2D process stores the snapshot in persistent, or nonvolatile, memory. When the driver restarts the vehicle, the Auto OS reboots the system and causes the snapshot that is stored in nonvolatile memory to be copied to volatile memory such that the state of volatile memory is exactly as it was when the driver turned off the vehicle. This process allows apps that the driver was running when the vehicle was turned off to be available to the driver upon restarting the vehicle without the driver having to restart the apps.

If volatile memory, referred to hereinafter as RAM, is fully occupied by software processes and associated data when the snapshot of RAM is taken and stored in nonvolatile memory, the snapshot that is copied from persistent memory to RAM on the next boot up may cause the driver to experience sluggish behavior from the system when trying to load new apps due to RAM already being fully occupied.

The system and method of the present disclosure overcome this problem. When, or just prior to, the system controller initiating S2D process entry, the system controller causes a memory controller to determine the percentage of volatile memory that is currently occupied and compares that percentage of occupancy to a predetermined threshold (TH) percentage. If the percentage of occupancy exceeds the predetermined TH percentage, then the memory controller tags apps that are running as either background apps or foreground apps, terminates the background apps, clears volatile memory of any instructions and data associated with the terminated background apps, takes a snapshot of the state of volatile memory after the terminated background apps and associated data have been cleared, and saves the snapshot to a designated storage location in nonvolatile memory before entering hibernate mode.

In the following detailed description, for purposes of explanation and not limitation, exemplary, or representative, embodiments disclosing specific details are set forth in order to provide a thorough understanding of an embodiment according to the present teachings. The word "exemplary" is used herein to mean "serving as an example, instance, or illustration." The words "illustrative" or "representative" may be used herein synonymously with "exemplary." Any aspect described herein as "exemplary" is not necessarily to be construed as preferred or advantageous over other aspects. However, it will be apparent to one having ordinary skill in the art and having the benefit of the present disclosure that other embodiments according to the present teachings that depart from the specific details disclosed herein remain within the scope of the appended claims. Moreover, descriptions of well-known apparatuses and methods may be omitted so as to not obscure the description of the example embodiments. Such methods and apparatuses are clearly within the scope of the present teachings.

The terminology used herein is for purposes of describing particular embodiments only and is not intended to be limiting. The defined terms are in addition to the technical and scientific meanings of the defined terms as commonly understood and accepted in the technical field of the present teachings.

As used in the specification and appended claims, the terms "a," "an," and "the" include both singular and plural referents, unless the context clearly dictates otherwise. Thus, for example, "a device" includes one device and plural devices.

Relative terms may be used to describe the various elements' relationships to one another, as illustrated in the accompanying drawings. These relative terms are intended to encompass different orientations of the device and/or elements in addition to the orientation depicted in the drawings.

It will be understood that when an element is referred to as being "connected to" or "coupled to" or "electrically coupled to" another element, it can be directly connected or coupled, or intervening elements may be present.

The term "memory device", as that term is used herein, is intended to denote a non-transitory computer-readable storage medium that is capable of storing computer instructions, or computer code, for execution by one or more processors. References herein to a "memory device" should be interpreted as including one or more memory devices.

A "processor", as that term is used herein encompasses an electronic component that is able to execute a computer program or executable computer instructions. References herein to a computer comprising "a processor" should be interpreted as one or more processors. The processor may for instance be a multi-core processor comprising multiple processing cores, each of which may comprise multiple processing stages of a processing pipeline. A processor may also refer to a collection of processors within a single system or distributed amongst multiple systems.

A "controller", as that term is used herein, encompasses an electronic component implemented in hardware, software and/or firmware that is able to perform operations for controlling one or more processors, other controllers or system components. References herein to "a controller" should be interpreted as one or more controllers. A controller may be, for example, a processor, as that term is defined herein.

Figure 1:
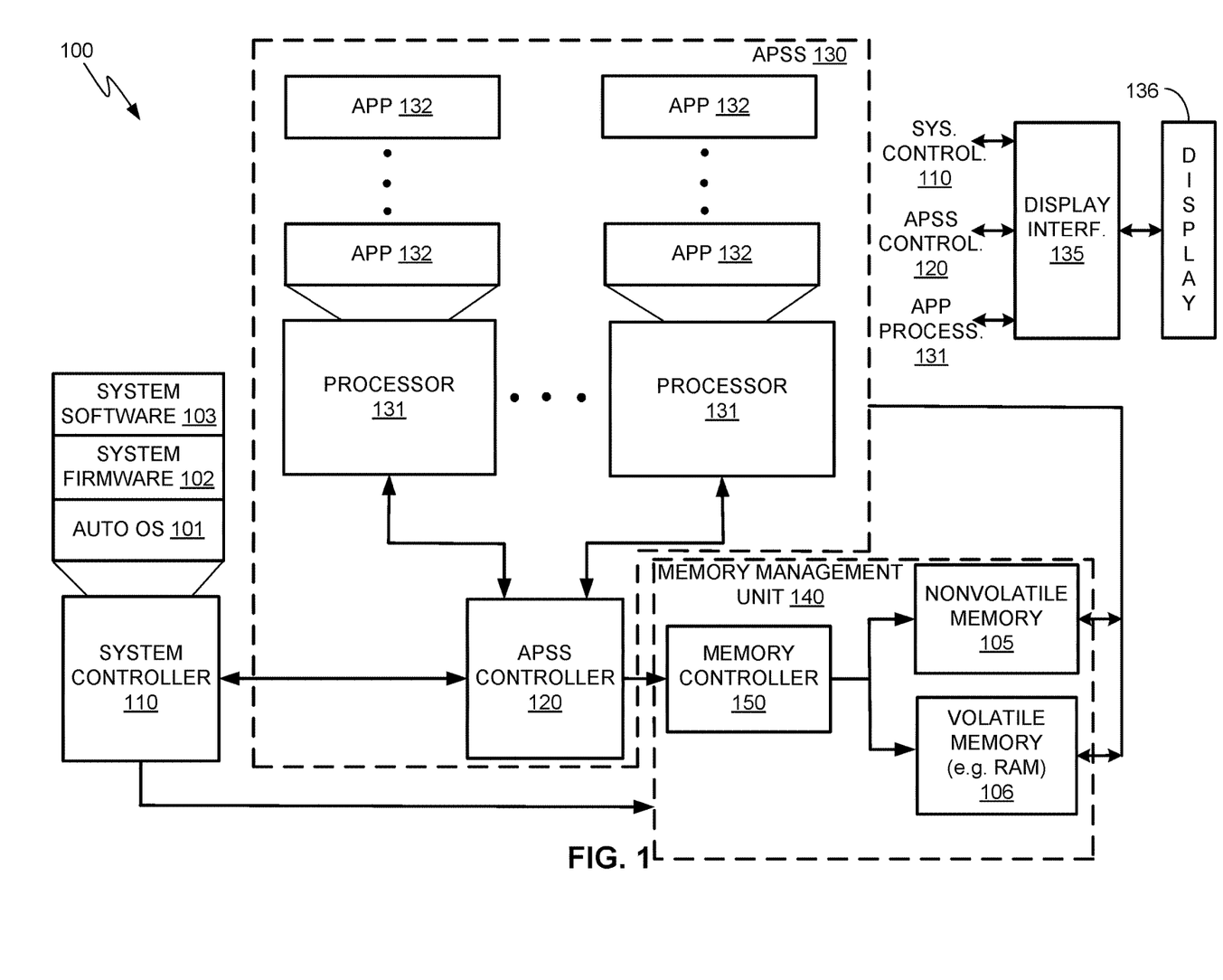
FIG. 1 illustrate a block diagram of a system that may be, for example, an ADAS/ADS system of a mobile vehicle (e.g., an automobile) or a component of the ADAS/ADS system, such as an ECU, for example.

FIG. 1 illustrates a block diagram of a system 100 that may be, for example, an ADAS/ADS system of a mobile vehicle (e.g., an automobile) or a component of the ADAS/

ADS system, such as an ECU, for example. A system controller 110 of the system 100 runs an Auto OS 101, such as, for example, some version of Android Auto OS, although the inventive principles and concepts are not limited regarding the type of OS that runs on the system controller 110. The system controller 110 also runs firmware 102 and/or software computer programs 103 for controlling operations of the system 100, including operations of an application processor subsystem (APSS) controller 120 of an APSS 130 of the system 100, as well as operations of a memory management unit 140 of the system 100.

The system controller 110 may be, for example, an MCU of an ADAS/ADS system, in which case the Auto OS 101 running on the MCU 110 performs the aforementioned operations of causing the system 100 to enter into and exit from the aforementioned S2D process when the driver of the vehicle turns the ignition of the vehicle off and on, respectively.

The APSS 130 typically comprises the APSS controller 120 and one or more processors 131 that are capable of being configured to execute software apps 132, such as, for example, infotainment apps, navigation apps, radio apps, phone apps, music apps, news apps, social media apps, etc.

The system 100 may include a display interface 135 that communicates with a display device 136. The display interface 135 is typically part of the system 100. The display device 136 may be part of the system 100 or it may be external to the system 100. The display device 136 can be operated by the driver via a mouse or it can be a touch screen panel or touch screen monitor that allows the driver to input commands to the system 100 by touching icons displayed on the display device 136. The system 100 can cause information to be displayed on the display device 136 via the display interface 135. The system 100 typically also includes one or more voice input devices and a corresponding interface (not shown) for allowing the driver to interact with the system 100 using voice commands.

When an app 132 is started by the driver of the vehicle, the app 132 is loaded from nonvolatile memory 105 into RAM 106. Data associated with the app 132 is also loaded into RAM 106. The data can include information that the app 132 processes to perform its functions. For example, if a navigation app 132 is loaded into RAM 106, GPS data and accelerometer data obtained from GPS and accelerometer sensors, respectively, can be fused together by sensor fusion circuitry (not shown) of the ADAS/ADS system and loaded into RAM 106 for processing by the navigation app 132.

In the current state-of-the-art, the system controller (e.g., the MCU) initiates S2D process entry when it detects that the driver has turned off the vehicle ignition. The current state-of-the-art process is to take a snapshot of RAM when the system controller initiates S2D process entry. Taking a snapshot of RAM means making a copy of the current state of RAM, which the system controller then stores in a designated storage location in nonvolatile memory and enters hibernate mode.

However, as indicated above, if RAM is fully occupied by software processes and associated data when the snapshot of RAM is taken and stored in nonvolatile memory, the snapshot that is copied from nonvolatile memory to RAM on the next boot up may cause the driver to experience sluggish behavior from the system when trying to load new apps due to RAM already being fully occupied. In accordance with this representative embodiment, when the system controller 110 initiates S2D process entry, or prior to the system controller 110 initiating S2D process entry, the system controller 110 causes the memory management unit 140 to determine, via the memory controller 150, the percentage of RAM 106 that is currently occupied and to compare that percentage of occupancy to a predetermined threshold (TH) percentage. The TH percentage can be preconfigured and varied with firmware based on requirements of the original equipment manufacturer (OEM), for example.

If the percentage of occupancy of RAM 106 does not exceed the predetermined TH percentage, then the memory management unit 140 causes the aforementioned state-of-the-art process to be performed, i.e., the memory controller 150 (1) takes a snapshot of the current state of RAM 106, (2) saves the snapshot to a designated storage location in nonvolatile memory 105, and (3) notifies the system controller 110 that it can place the system 100 in hibernate mode.

If, however, the percentage of occupancy exceeds the predetermined TH percentage, then the memory controller 150 causes the following processes to be performed: (1) tag apps 132 that are running as background apps 132 and foreground apps 132 (2) terminate the background apps 132, (3) clear RAM 106 of any instructions and data associated with the terminated background apps 132. (4) take a snapshot of the current state of RAM 106 after the terminated background apps 132 and associated data have been cleared out of RAM 106, (5) save the snapshot to a designated storage location in nonvolatile memory 105, and (6) enter hibernate mode.

Performing processes (1)-(6) ensures that when the ignition is turned on again, the boot up of the system 100 will not cause the driver to experience sluggish behavior from the system 100 when trying to load new apps 132 because RAM 106 will not be fully occupied at the time of reboot.

The term "foreground app", as that term is used herein, typically refers to operations or processes that run in the foreground and may demand direct user input, as well as operations or processes that are essential to Auto OS 101. These operations or processes are actively being used by the user, take priority over other tasks, may receive input/feedback from the user, or are essential to Auto OS 101. The term "background app", as that term is used herein, typically refers to processes or applications that were formerly in the foreground, but were later transferred to the background following execution. It should be noted that the meanings of the terms "foreground app" and "background app" can vary depending on the manner in which the system 100 is implemented and/or based on priorities that the system 100 is designed to have.

For example, the driver engages with a messaging app or a music app that has a visible interface for drafting messages or selecting songs from a playlist, respectively. During engagement, the app is a foreground app, but then is transferred to the background as the message is delivered or the requested song is played, respectively.

As stated above, apps 132 that are tagged as background apps 132 are terminated and cleared from RAM 106 during processes (2) and (3) above, whereas apps 132 that have been tagged as foreground apps 132 are not terminated or cleared from RAM 106 during processes (2) and (3). It should be noted that it is not necessary to tag both background apps 132 and foreground apps 132, but only either background apps 132 or foreground apps 132. It should be noted that the term "tagging", as that term is used herein, means anything that allows the memory controller 150 to distinguish between background and foreground apps 132.

Figure 2:
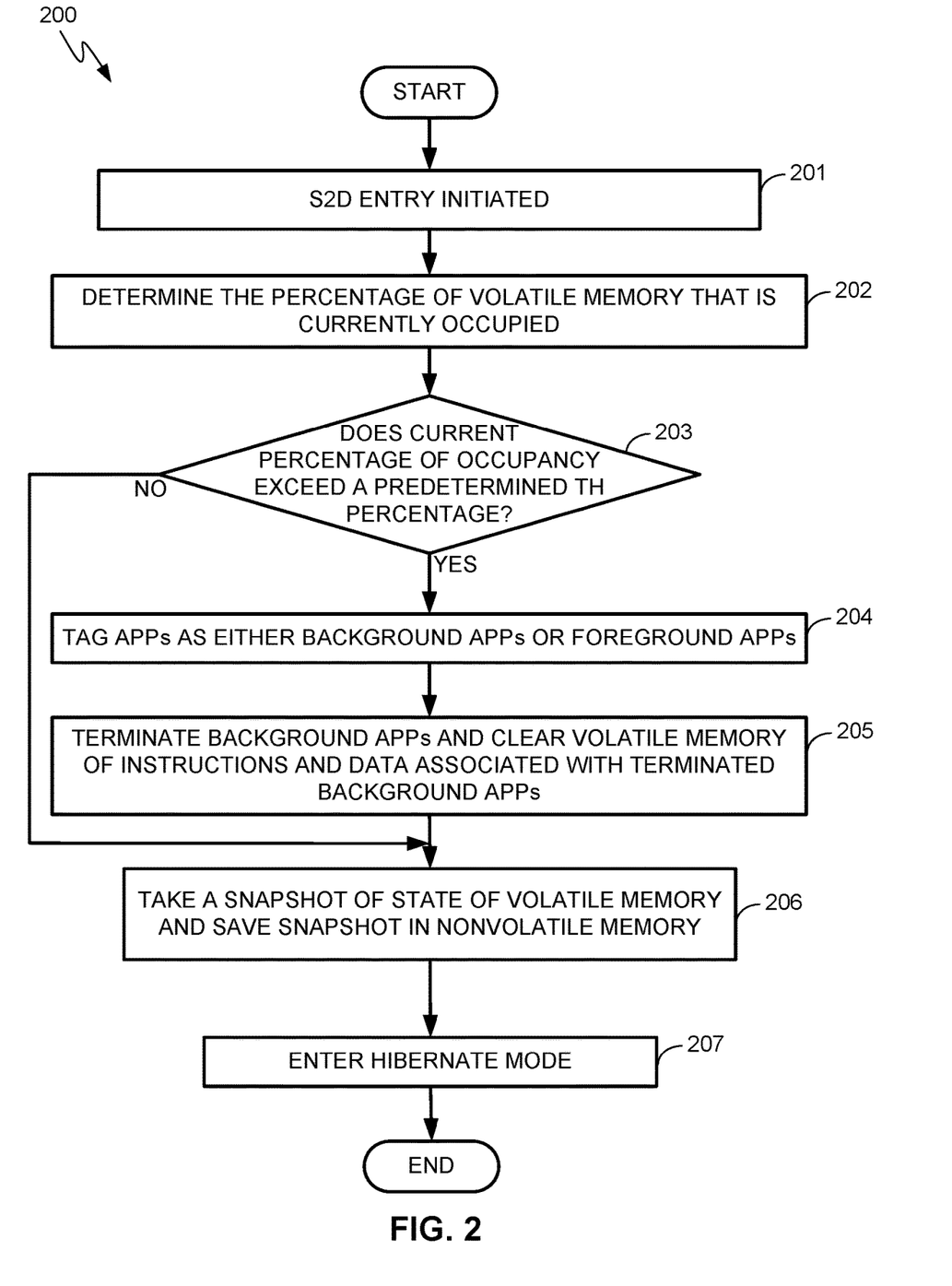
FIG. 2 illustrates a flow diagram representing the method in accordance with a representative embodiment.

FIG. 2 illustrates a flow diagram representing the method 200 in accordance with a representative embodiment. The system controller 110 initiates S2D process entry, as indicated by block 201. As indicated above, this can happen when the system controller 110 is notified by the Auto OS 101 that the ignition has been turned off. When the system controller 110 initiates S2D process entry, or just prior to the system controller 110 initiating S2D process entry, the system controller 110 causes the memory management unit 140 to determine, via the memory controller 150, the percentage of volatile memory 106 that is currently occupied, as indicated by block 202. The percentage of occupancy is then compared to the predetermined TH percentage and a determination is made as to whether or not the current percentage of volatile memory occupancy exceeds the predetermined TH percentage, as indicated by block 203. As indicated above, the TH percentage can be preconfigured and preferably can be varied with firmware.

If the percentage of occupancy exceeds the predetermined TH percentage, then the memory controller 150 tags apps 132 as either background apps 132 or foreground apps 132, as indicated by block 204. The tagged background apps 132 are then terminated and any instructions and data associated with the terminated background apps 132 are cleared from volatile memory 106, as indicated by block 205. A snapshot of the current state of volatile memory 106 is then taken and saved at a designated location in nonvolatile memory 105, as indicated by block 206. The system 100 then enters into hibernate mode, as indicated by block 207.

If a determination is made at block 203 that the current percentage of occupancy of volatile memory 106 does not exceed the predetermined TH percentage, then the memory controller 150 takes a snapshot of the current state of volatile memory 106 and saves the snapshot to a designated storage location in nonvolatile memory 105, as indicated by block 206. The system 100 then enters into hibernate mode, as indicated by block 207.

When the memory controller 150 takes a "snapshot", this involves making a copy of the state of RAM 106 at all of the memory addresses of RAM 106. In addition, taking the snapshot involves address mapping. The memory controller 150 keeps track of the addresses in RAM 106 where all of the bits are stored by mapping the physical addresses of RAM 106 to the corresponding addresses in the designated storage space of the nonvolatile memory 105 where the snapshot is being stored. This mapping information is subsequently used for accurately restoring the state of RAM 106 during a wake-up process of the system 100 that brings the system 100 out of hibernate mode.

As a result of the system 100 performing the method 200, upon entering hibernate state, a quality snapshot of the RAM 106 is saved in nonvolatile memory 105, which allows a quick restoration of the previous state of the system 100 to be obtained upon resuming the normal active mode of operations. As a result, users will not experience any, or as much, sluggishness in the user-space of the system 100, such as delay in opening or using apps when starting the engine.

Figure 3:
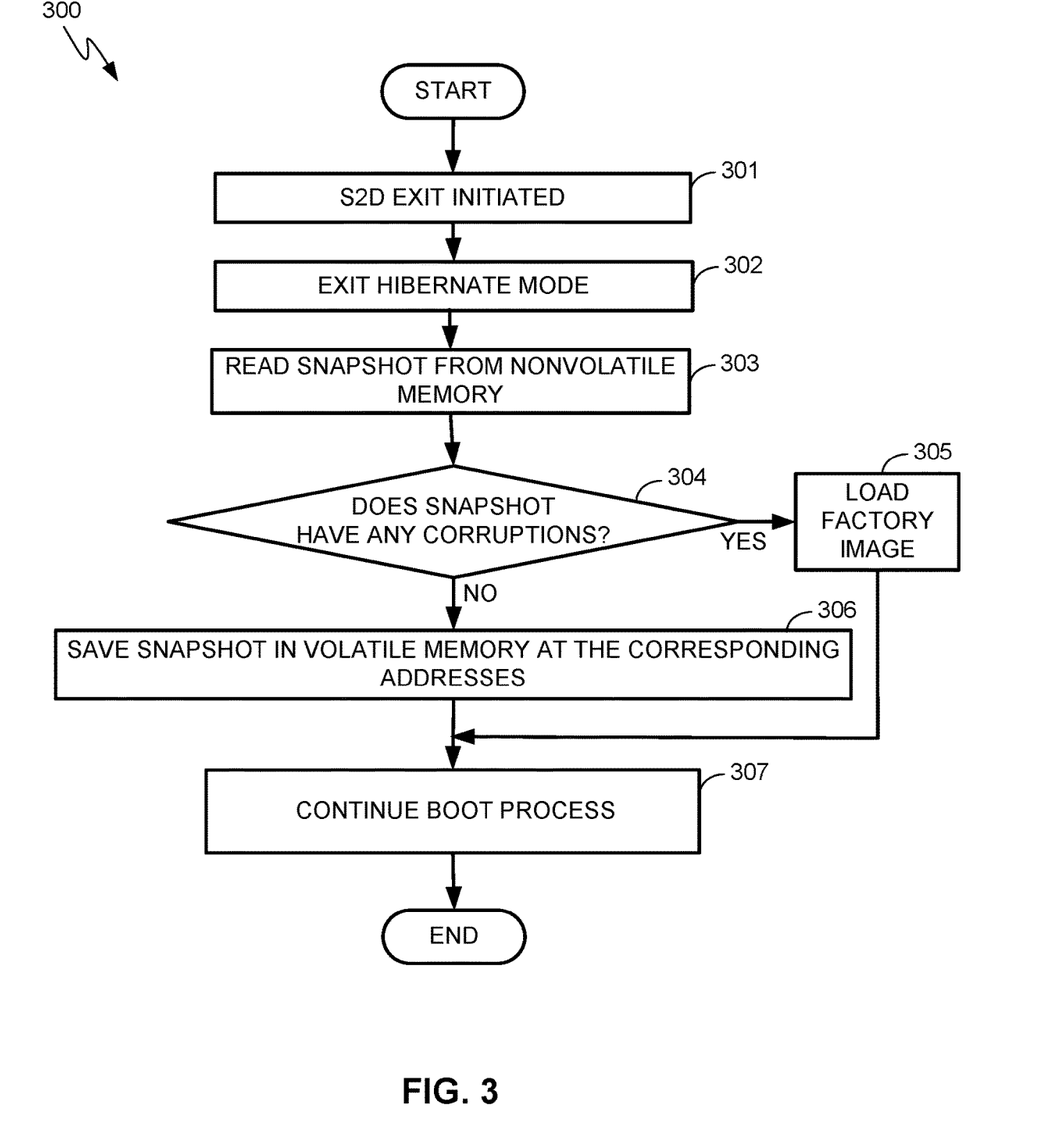
FIG. 3 is a flow diagram of the method for restoring the snapshot to volatile memory after S2D process exit is initiated by the system controller shown in FIG. 1.

FIG. 3 is a flow diagram of the method 300 for restoring the snapshot to volatile memory 106 after S2D process exit is initiated by the system controller 110. Block 301 represents the process of the Auto OS informing the system controller 110 that it is time to initiate exit of the S2D process due to the ignition of the vehicle being turned on, which causes the system 100 to exit hibernate mode, as indicated by block 302. The system controller 110 causes the memory controller 150 to read the snapshot from nonvolatile memory 105, as indicated by block 303, and determine whether the snapshot contains any corruptions, as indicated by block 304. If so, the memory controller 150 preferably loads the volatile memory factory image into the volatile memory 106, as indicated by block 305. The reboot process then continues, as indicated by block 307.

If the memory controller 150 determines at step 304 that the snapshot read from nonvolatile memory 105 does not contain any corruptions, the snapshot is saved in volatile memory 106 at the addresses contained in the aforementioned memory mapping, as indicated by block 306. The reboot process then continues, as indicated by block 307.

With reference again to FIG. 2, the method 200 is triggered, or invoked, upon initiation of entry into the S2D process. At least some of the processes represented by the flow diagram of FIG. 2 can be performed prior to initiation of entry into the S2D. To further reduce latency in restoring the previous state of RAM 106 and to further improve performance, the processes represented by blocks 202 and 203 can be performed prior to S2D process entry, as will now be described with reference to FIG. 4.

Figure 4:
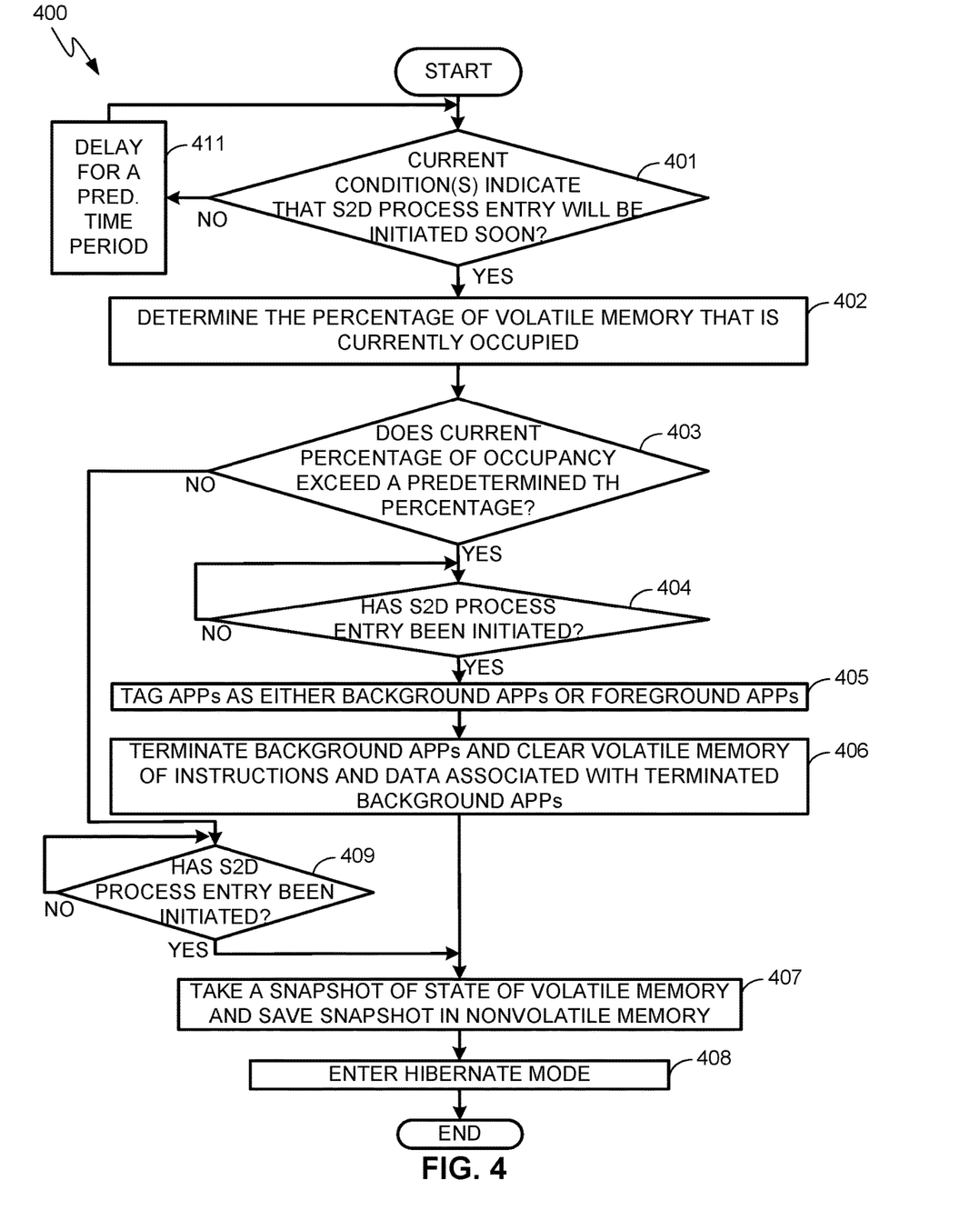
FIG. 4 is a flow diagram representing the method in accordance with a representative embodiment in which the processes represented by blocks 202 and 203 of FIG. 2 are triggered upon detection of one or more current conditions indicating that the vehicle ignition is likely to be turned off very soon, causing S2D process entry to be initiated.

FIG. 4 is a flow diagram representing the method 400 in accordance with a representative embodiment in which the processes represented by blocks 202 and 203 are triggered upon detection of one or more current conditions indicating that the vehicle ignition is likely to be turned off very soon, causing S2D process entry to be initiated by the system controller 110. Blocks 402 and 403 of FIG. 4 correspond to blocks 202 and 203, respectively, of FIG. 2. Blocks 405-408 correspond to blocks 203-206, respectively, of FIG. 2.

The condition(s) that triggers the performance of the processes represented by blocks 402 and 403 can be, for example, the vehicle being near a destination that has been set in the navigation system of the vehicle by the vehicle driver. Block 401 represents the process of the system controller 110 determining whether the current condition(s) indicates that S2D process entry will be initiated soon. For example, a time TH value can be preselected or preconfigured into the system controller 110 for this purpose and periodically compared to the estimated time to arrival (ETA) generated by the navigation system.

When the system controller 110 determines that the ETA is less than the time TH value, the system controller 110 causes the memory controller 150 to determine the percentage of volatile memory that is currently occupied at the step represented by block 402, and determines whether the percentage of occupancy exceeds the predetermined TH percentage at the step represented by block 403. If so, the process proceeds to block 404 and waits until a determination is made by the system controller 110 that S2D process entry has been initiated. If the process represented by block 401 is answered in the negative, the process represented by block 401 can be repeated after a delay of a predetermined time period, which will typically be shorter than the predetermined time TH value. The time delay is represented in FIG. 4 by block 411.

Upon determining at block 404 that S2D process entry has been initiated, the process proceeds to block 405 and then the processes represented by blocks 405-408 are performed, which have been described above with reference to blocks 203-206, respectively, of FIG. 2.

If a determination is made at block 403 that the percentage of occupancy does not exceed the predetermined TH percentage, the process can proceed to block 409 at which a determination is made as to whether or not S2D process entry has been initiated. If not, the process of block 409 can be repeated until a determination is made the S2D process entry has been initiated. Once a determination is made at block 409 that the S2D process entry has been initiated, the process proceeds to block 407 and the processes of blocks 407 and 408 are performed.

As an alternative to proceeding from the process of block 403 to the process of block 409 when the process of block 403 is answered in the negative, the process can proceed from block 403 to block 411 before returning to the process represented by block 401. In the latter case, the process represented by block 409 can be eliminated.

Other current conditions that can be used at block 401 include, for example, the distance of the vehicle from the destination set in the navigation of the system. For example, a TH distance might be 0.5 kilometers (km), in which case the process represented by block 402 can begin being performed when the system controller 110 determines at block 401 that the current location of the vehicle is within 0.5 km of the destination.

Other current conditions that can be used at block 401 include, for example, the speed of the vehicle, particularly for cases where the user has not set a destination in the navigation system of the vehicle. For example, if the speed of the vehicle is below 10 km per hour, then this can be an indication that it is likely that the driver is about to stop the vehicle and turn off the ignition, unless the vehicle is in a high-traffic area where traffic jams are common. In this example, the conditions can include (1) the low speed of the vehicle being less than a TH speed and (2) the location of the vehicle, both of which can be determined from the navigation system. If the vehicle speed is less than the TH speed and the vehicle is in a high traffic area or on the interstate, which we can be detected using GPS sensors of the navigation system, then it is unlikely that the driver will turn off the vehicle ignition soon. Under these current conditions, the process of block 401 would be answered in the negative.

If, however, the speed of the vehicle is below the TH speed and the vehicle is in a parking lot of a grocery store, for example, then this is an indication that it is likely that the driver will stop the vehicle and turn off the ignition soon. Under these current conditions, the process of block 401 would be answered in the affirmative and the process 400 would proceed to block 402.

The conditions mentioned above are only a few examples of current conditions that can be taken into account at block 401. Navigation systems can also be configured to remember locations that are frequently visited by the vehicle driver, such as the driver's home, the driver's office, restaurants that the driver frequents, etc. Thus, there is a large amount of data that is available to the system controller 110 that can be used as conditions in block 401. Also, with the proliferation of artificial intelligence (AI) and machine learning, there can be vast amounts of data available and algorithms for processing data obtained from vehicle sensors to determine with high a high degree of certainty when the vehicle ignition is about to be turned off and entry into the S2D process is about to be initiated. Therefore, the inventive principles and concepts of the present disclosure are not limited with respect to the types of conditions that can be used at block 401, as will be understood by persons of skill in the art in view of the description being provided herein.

Figure 5:
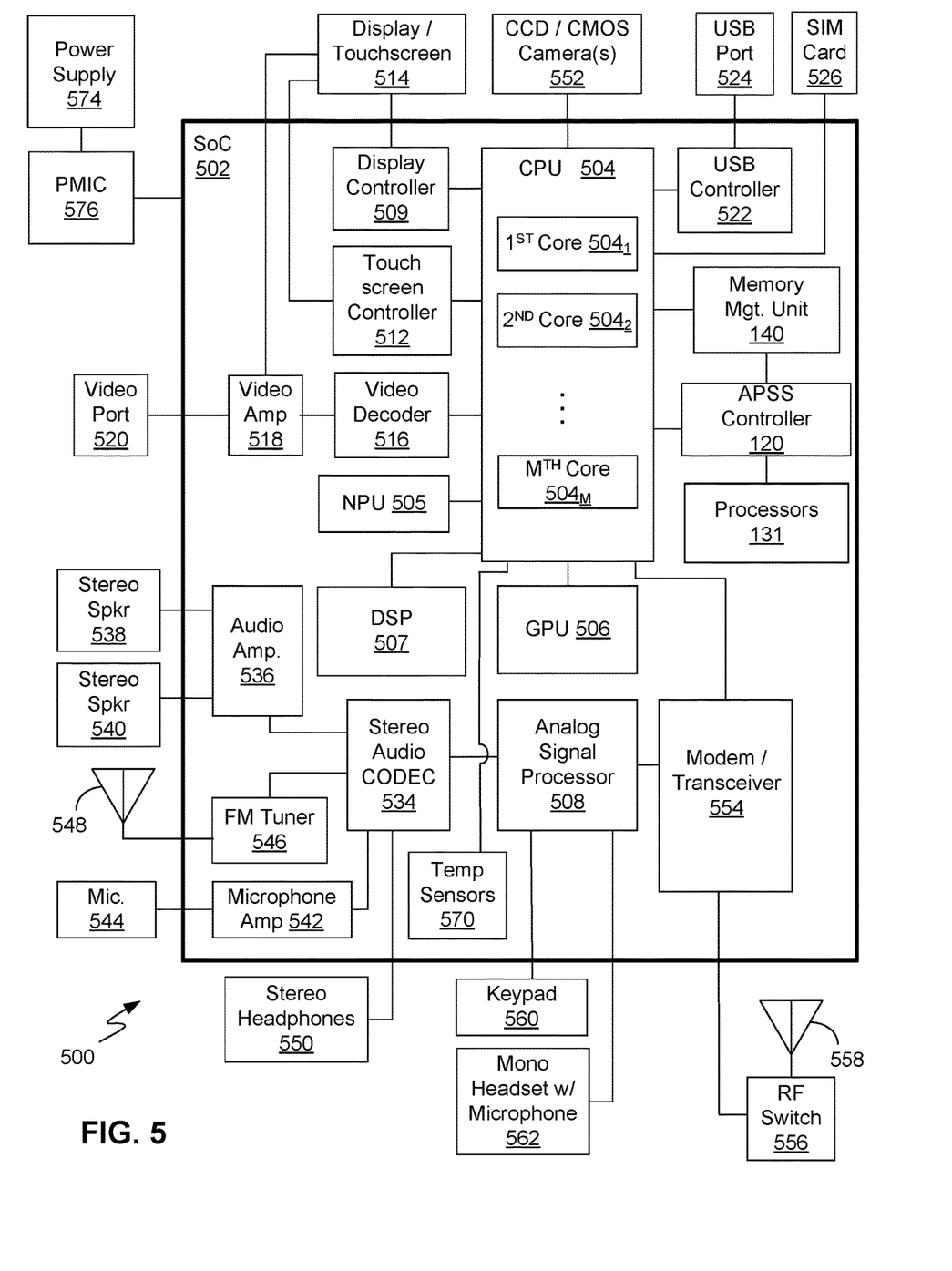
FIG. 5 illustrates an example of a PCD, such as a mobile phone, a smartphone, a portable game console such as an Extended Reality (XR) device, a Virtual Reality (VR) device, an Augmented Reality (AR) device, or a Mixed Reality (MR) device, etc., in which exemplary embodiments of systems, methods, computer-readable media, and other examples of the inventive principles and concepts of the present disclosure may be implemented.

FIG. 5 illustrates an example of a PCD 500, such as a mobile phone, a smartphone, a portable game console such as an Extended Reality (XR) device, a Virtual Reality (VR) device, an Augmented Reality (AR) device, or a Mixed Reality (MR) device, etc., in which exemplary embodiments of systems, methods, computer-readable media, and other examples of the inventive principles and concepts of the present disclosure may be implemented. In accordance with this representative embodiment, the PCD 500 comprises an SoC 502 that comprises the system 100 shown in FIG. 1. For purposes of clarity, some interconnects, signals, etc., are not shown in FIG. 5.

The SoC 502 may include a CPU 504, an NPU 505, a GPU 506, a DSP 507, an analog signal processor 508, a modem/transceiver subsystem 554, or other processors. The CPU 504 may include one or more CPU cores, such as a first CPU core $504_1$, a second CPU core $504_2$, etc., through an $M^{th}$ CPU core $504_M$.

A display controller 509 and a touch-screen controller 512 may be coupled to the CPU 504. A touchscreen display 514 external to the SoC 502 may be coupled to the display controller 510 and the touch-screen controller 512. The PCD 500 may further include a video decoder 516 coupled to the CPU 504. A video amplifier 518 may be coupled to the video decoder 516 and the touchscreen display 514. A video port 520 may be coupled to the video amplifier 518. A universal serial bus ("USB") controller 522 may also be coupled to CPU 504, and a USB port 524 may be coupled to the USB controller 522. A subscriber identity module ("SIM") card 526 may also be coupled to the CPU 504.

The memory management unit 140 may comprise one or more memories and may be coupled to the CPU 504. The one or more memories may include both volatile and non-volatile memories, such as those described above with reference to FIG. 1. Examples of volatile memories include static random access memory ("SRAM") and dynamic random access memory ("DRAM"). Such memories may be external to the SoC 502 or internal to the SoC 502. The one or more memories may include local cache memory or a system-level cache memory.

A stereo audio CODEC 534 may be coupled to the analog signal processor 508. Further, an audio amplifier 536 may be coupled to the stereo audio CODEC 534. First and second stereo speakers 538 and 540, respectively, may be coupled to the audio amplifier 536. In addition, a microphone amplifier 542 may be coupled to the stereo audio CODEC 534, and a microphone 544 may be coupled to the microphone amplifier 542. A frequency modulation ("FM") radio tuner 546 may be coupled to the stereo audio CODEC 534. An FM antenna 548 may be coupled to the FM radio tuner 546. Further, stereo headphones 550 may be coupled to the stereo audio CODEC 534. Other devices that may be coupled to the CPU 504 include one or more digital (e.g., CCD or CMOS) cameras 552.

The modem/transceiver subsystem 554 may be coupled to the analog signal processor 508 and the CPU 504. An RF switch 556 may be coupled to the modem/transceiver 554 and to an RF antenna 558. In addition, a keypad 560 and a mono headset with a microphone 562 may be coupled to the analog signal processor 508. The SoC 502 may have one or more internal or on-chip thermal sensors 570. A power supply 574 and a power management IC (PMIC) 576 may supply power to the SoC 502.

Firmware or software may be stored in any of the above-described memories, such as memory of the memory management unit 140, or may be stored in a local memory directly accessible by the processor hardware on which the software or firmware executes. A processor such as, for example, CPU 504, GPU 506, NPU 505 or DSP 507, may perform the operations of the system controller 110 shown in FIG. 1. Execution of such firmware or software by the APSS controller 120, the memory management unit 140, the CPU 504, the GPU 506, the NPU 505 and/or the DSP 507 may control aspects of any of the above-described methods or configure aspects of any of the above-described systems. Any such memory or other non-transitory storage medium having firmware or software stored therein in computer-readable form for execution by processor hardware may be an example of a "computer-readable medium," as the term is understood in the patent lexicon.

Figure 6:
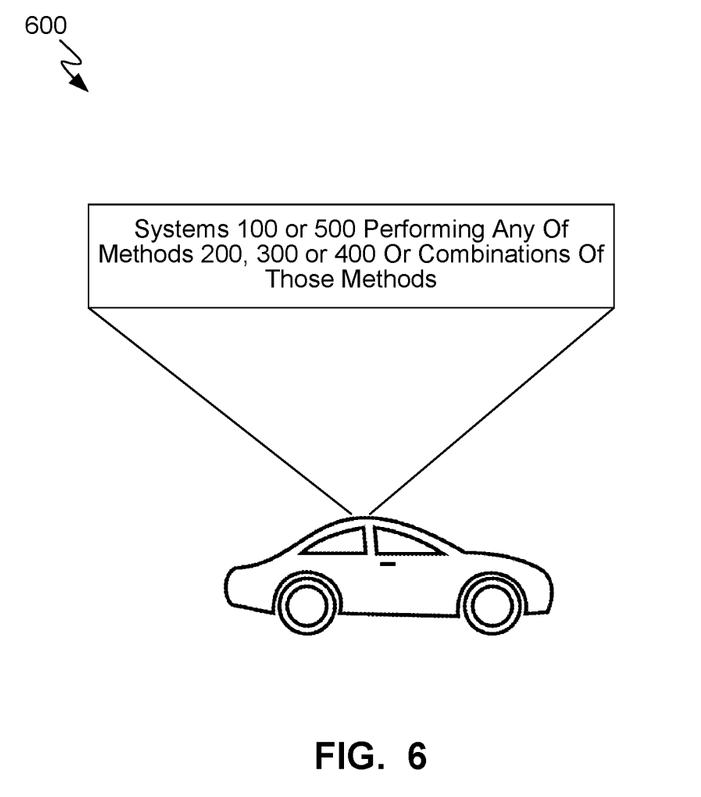
FIG. 6 is a pictorial image of a vehicle in which the system shown in FIG. 1 or 5 performing any of the methods shown in FIGS. 2-4, or combinations thereof, is incorporated as part of an ADAS/ADS system of the vehicle.

FIG. 6 is a pictorial image of an automobile 600 in which the system 100 or 500 shown in FIGS. 1 and 5, respectively, performing any of the methods 200, 300 or 400 shown in FIGS. 2, 3 and 4, respectively, or combinations thereof is incorporated as part of an ADAS/ADS system of the automobile 600 to reduce latency in rebooting the system 100, 500 when the ignition of the vehicle 600 is turned on after being turned off. As indicated above, the reboot of the system 100, 500 will not cause the driver to experience sluggish behavior from the system 100, 500 when trying to load new apps because the methods 200-400 ensure that RAM 106 will not be fully occupied at the time of reboot.

Implementation examples are described in the following numbered clauses:

1. A method for reducing latency in rebooting a system that runs an Auto OS, the system being embedded in a mobile vehicle, the method comprising:
   before performing an S2D process, determining whether or not an amount of storage space of a volatile memory device of the system that is currently in use exceeds a preselected TH value;
   if the amount of storage space of the volatile memory device of the system that is currently in use exceeds the preselected TH value, selecting one or more computer programs that are stored in the volatile memory device for termination, terminating the selected one or more computer programs, and clearing the volatile memory device of the selected one or more computer programs and of data associated with the selected one or more computer programs; and
   after deleting the selected one or more computer programs and data associated with the selected one or more computer programs from the volatile memory device, performing the S2D process.

2. The method of clause 1, wherein the S2D process comprises:
   capturing a snapshot of a state of the volatile memory device; and
   storing the captured state of the volatile memory device in a designated storage space of a nonvolatile memory device of the system.

3. The method of any of clauses 1-2, wherein the step of determining whether or not the amount of storage space of the volatile memory device that is currently in use exceeds the preselected TH value is performed upon initiation of entry into the S2D process.

4. The method of any of clauses 1-2, wherein the step of determining whether or not the amount of storage space of the volatile memory device that is currently in use exceeds the preselected TH value is performed prior to initiation of entry into the S2D process, and wherein the method further comprises:
   determining whether or not one or more conditions indicate that an S2D process will be initiated within a short period of time, and if so, performing the step of determining whether or not the amount of storage space of the volatile memory device that is currently in use exceeds the preselected TH value.

5. The method of clause 4, wherein said one or more conditions include at least a first condition indicating that it is likely that an ignition of the mobile vehicle will be turned off soon.

6. The method of clause 5, wherein said at least a first condition is met if a determination is made that the mobile vehicle will likely arrive at a target destination within a time period that is less than a preselected TH time period.

7. The method of clause 5, wherein said at least a first condition is met if a determination is made that a speed of the mobile vehicle is less than a preselected TH speed.

8. The method of clause 7, wherein said at least a first condition includes a second condition that is met if a determination is made that the mobile vehicle is at a location that is likely to be a target destination of the mobile vehicle.

9. The method of any of clauses 1-8, wherein the step of selecting one or more computer programs that are stored in the volatile memory device for termination comprises tagging computer programs stored in the volatile memory device as either background computer programs or foreground computer programs, and wherein the step of terminating the selected one or more computer programs comprises terminating the computer programs that are tagged as background computer programs.

10. The method of clause 9, wherein foreground computer programs are computer programs that perform at least one of (1) operations or processes that are actively being used by a user of the system, (2) operations or processes that take priority over other tasks being performed by the system, (3) operations or processes that require input from the user, and (4) operations or processes that are essential to the Auto OS, and wherein background computer programs are computer programs that were formerly in the foreground computer programs that became background computer programs following execution of the respective foreground computer programs.

11. A system for reducing latency in rebooting a system that runs an Auto OS, the system being embedded in a mobile vehicle, the system comprising:
   a memory controller comprising:
   logic configured to determine, before performing an S2D process, whether or not an amount of storage space of a volatile memory device of the system that is currently in use exceeds a preselected TH value;
   logic configured to select one or more computer programs that are stored in the volatile memory device for termination if the amount of storage space of the volatile memory device of the system that is currently in use exceeds the preselected TH value;
   logic configured to terminate the selected one or more computer programs and to delete the selected one or more computer programs and data associated with the selected one or more computer programs from the volatile memory device; and
   logic configured to perform the S2D process after deleting the selected one or more computer programs and data associated with the selected one or more computer programs from the volatile memory device.

12. The system of clause 11, wherein the logic configured to perform the S2D process comprises:
   logic configured to capture a snapshot of a state of the volatile memory device; and
   logic configured to store the captured state of the volatile memory device in a designated storage space of a nonvolatile memory device of the system.

13. The system of any of clauses 11-12, wherein the logic configured to determine whether or not the amount of storage space of the volatile memory device that is currently in use exceeds the preselected TH value is activated upon initiation of entry into the S2D process.

14. The system of clause 12, wherein the logic configured to determine whether or not the amount of storage space of the volatile memory device that is currently in use exceeds the preselected TH value is activated prior to initiation of entry into the S2D process and comprises:
   logic configured to determine whether or not one or more conditions indicate that an S2D process will be initiated within a short period of time, and if so, to activate the logic configured to determine whether or not the amount of storage space of the volatile memory device that is currently in use exceeds the preselected TH value.

15. The system of clause 14, wherein said one or more conditions include at least a first condition indicating that it is likely that an ignition of the mobile vehicle will be turned off soon.

16. The system of clause 15, wherein said at least a first condition is met if a determination is made that the mobile vehicle will likely arrive at a target destination within a time period that is less than a preselected TH time period.

17. The system of clause 15, wherein said at least a first condition is met if a determination is made that a speed of the mobile vehicle is less than a preselected TH speed.

18. The system of clause 17, wherein said at least a first condition includes a second condition that is met if a determination is made that the mobile vehicle is at a location that is likely to be a target destination of the mobile vehicle.

19. The system of any of clauses 11-18, wherein the logic configured to select one or more computer programs that are stored in the volatile memory device for termination comprises:
   logic configured to tag computer programs stored in the volatile memory device as either background computer programs or foreground computer programs, and wherein the logic configured to terminate the selected one or more computer programs comprises logic configured to terminate the computer programs that are tagged as background computer programs.

20. The system of clause 19, wherein foreground computer programs are computer programs that perform at least one of (1) operations or processes that are actively being used by a user of the system, (2) operations or processes that take priority over other tasks being performed by the system, (3) operations or processes that require input from the user, and (4) operations or processes that are essential to the Auto OS, and wherein background computer programs are computer programs that were formerly in the foreground computer programs that became background computer programs following execution of the respective foreground computer programs.

21. A computer program for reducing latency in rebooting a system that runs an Automobile Operating System (Auto OS), the system being embedded in a mobile vehicle, the computer program being embodied on a non-transitory computer readable medium and comprising instructions for execution by a processor or controller, the computer program comprising:
   a first set of computer instructions for determining, before performing an S2D process, whether or not an amount of storage space of a volatile memory device of the system that is currently in use exceeds a preselected TH value;
   a second set of computer instructions for selecting one or more computer programs that are stored in the volatile memory device for termination if the amount of storage space of the volatile memory device of the system that is currently in use exceeds the preselected TH value;
   a third set of computer instructions for terminating the selected one or more computer programs and deleting the selected one or more computer programs and data associated with the selected one or more computer programs from the volatile memory device; and
   a fourth set of computer instructions for performing the S2D process after deleting the selected one or more computer programs and data associated with the selected one or more computer programs from the volatile memory device.

22. The computer program of clause 21, wherein the fourth set of computer instructions comprises:
   computer instructions for capturing a snapshot of a state of the volatile memory device; and
   computer instructions for storing the captured state of the volatile memory device in a designated storage space of a nonvolatile memory device of the system.

23. The computer program of any of clauses 21-22, wherein the first set of computer instructions is performed upon initiation of entry into the S2D process.

24. The computer program of any of clauses 21-22, wherein the first set of computer instructions is performed prior to initiation of entry into the S2D process and comprises:
   computer instructions for determining whether or not one or more conditions indicate that an S2D process will be initiated within a short period of time, and if so, for causing computer instructions to be performed that determine whether or not the amount of storage space of the volatile memory device that is currently in use exceeds the preselected TH value.

25. The computer program of clause 24, wherein said one or more conditions include at least a first condition indicating that it is likely that an ignition of the mobile vehicle will be turned off soon.

26. The computer program of clause 25, wherein said at least a first condition is met if a determination is made that the mobile vehicle will likely arrive at a target destination within a time period that is less than a preselected TH time period.

27. The computer program of clause 25, wherein said at least a first condition is met if a determination is made that a speed of the mobile vehicle is less than a preselected TH speed.

28. The computer program of clause 27, wherein said at least a first condition includes a second condition that is met if a determination is made that the mobile vehicle is at a location that is likely to be a target destination of the mobile vehicle.

29. The computer program of any of clauses 21-28, wherein the second set of computer instructions for selecting one or more computer programs that are stored in the volatile memory device for termination comprises:
   computer instructions for selecting computer programs stored in the volatile memory device that have been tagged as background computer programs, and wherein the third set of computer instructions terminates the computer programs that are tagged as background computer programs, wherein foreground computer programs are computer programs that perform at least one of (1) operations or processes that are actively being used by a user of the system, (2) operations or processes that take priority over other tasks being performed by the system, (3) operations or processes that require input from the user, and (4) operations or processes that are essential to the Auto OS, and wherein background computer programs are computer programs that were formerly in the foreground computer programs that became background computer programs following execution of the respective foreground computer programs.

30. A system for reducing latency in rebooting a system that runs an Auto OS, the system being embedded in a mobile vehicle, the system comprising:
    means for determining, before performing an S2D process, whether or not an amount of storage space of a volatile memory device of the system that is currently in use exceeds a preselected TH value;
    means for selecting one or more computer programs that are stored in the volatile memory device for termination if the amount of storage space of the volatile memory device of the system that is currently in use exceeds the preselected TH value;
    means for terminating the selected one or more computer programs and for deleting the selected one or more computer programs and data associated with the selected one or more computer programs from the volatile memory device; and
    means for performing the S2D process after deleting the selected one or more computer programs and data associated with the selected one or more computer programs from the volatile memory device.

Alternative embodiments will become apparent to one of ordinary skill in the art to which the invention pertains in view of the present disclosure. Therefore, although selected aspects have been illustrated and described in detail, it will be understood that various substitutions and alterations may be made therein.

What is claimed is:

1. A method for reducing latency in rebooting a system that runs an Automobile Operating System (Auto OS), the system being embedded in a mobile vehicle, the method comprising:
    when a movement or location of the mobile vehicle indicates a suspend-to-disk (S2D) process will be initiated and before performing a S2D process, determining whether or not an amount of storage space of a volatile memory device of the system that is currently in use exceeds a preselected threshold (TH) value;
    if the amount of storage space of the volatile memory device of the system that is currently in use exceeds the preselected TH value, selecting one or more computer programs that are stored in the volatile memory device for termination, terminating the selected one or more computer programs, and clearing the volatile memory device of the selected one or more computer programs and of data associated with the selected one or more computer programs; and
    after deleting the selected one or more computer programs and data associated with the selected one or more computer programs from the volatile memory device, performing the S2D process.

2. The method of claim 1, wherein the S2D process comprises:
    capturing a snapshot of a state of the volatile memory device; and
    storing the captured state of the volatile memory device in a designated storage space of a nonvolatile memory device of the system.

3. The method of claim 2, wherein the step of determining whether or not the amount of storage space of the volatile memory device that is currently in use exceeds the preselected TH value is performed upon initiation of entry into the S2D process.

4. The method of claim 2, wherein the step of determining whether or not the amount of storage space of the volatile memory device that is currently in use exceeds the preselected TH value is performed prior to initiation of entry into the S2D process, and wherein the method further comprises:
    determining whether or not one or more conditions indicate that an S2D process will be initiated within the short period of time, and if so, performing the step of determining whether or not the amount of storage space of the volatile memory device that is currently in use exceeds the preselected TH value.

5. The method of claim 4, wherein said one or more conditions include at least a first condition indicating that it is likely that an ignition of the mobile vehicle will be turned off soon.

6. The method of claim 5, wherein said at least a first condition is met if a determination is made that the mobile vehicle will likely arrive at a target destination within a time period that is less than a preselected TH time period.

7. The method of claim 5, wherein said at least a first condition is met if a determination is made that a speed of the mobile vehicle is less than a preselected TH speed.

8. The method of claim 7, wherein said at least a first condition includes a second condition that is met if a determination is made that the mobile vehicle is at a location that is likely to be a target destination of the mobile vehicle.

9. The method of claim 1, wherein the step of selecting one or more computer programs that are stored in the volatile memory device for termination comprises tagging computer programs stored in the volatile memory device as either one or more background computer programs or one or more foreground computer programs, and wherein the step of terminating the selected one or more computer programs comprises terminating the computer programs that are tagged as background computer programs.

10. The method of claim 9, wherein the foreground computer programs are computer programs that perform at least one of (1) operations or processes that are actively being used by a user of the system, (2) operations or processes that take priority over other tasks being performed by the system, (3) operations or processes that require input from the user, and (4) operations or processes that are essential to the Auto OS, and wherein the background computer programs are computer programs that were formerly in the foreground computer programs that became background computer programs following execution of the respective foreground computer programs.

11. A system for reducing latency in rebooting a system that runs an Automobile Operating System (Auto OS), the system being embedded in a mobile vehicle, the system comprising:
    a memory controller comprising:
        logic configured to determine, when a movement or location of the mobile vehicle indicates a suspend-to-disk (S2D) process will be initiated and before performing a S2D process, whether or not an amount of storage space of a volatile memory device of the system that is currently in use exceeds a preselected threshold (TH) value;
        logic configured to select one or more computer programs that are stored in the volatile memory device for termination if the amount of storage space of the volatile memory device of the system that is currently in use exceeds the preselected TH value;
        logic configured to terminate the selected one or more computer programs and to delete the selected one or more computer programs and data associated with the selected one or more computer programs from the volatile memory device; and logic configured to perform the S2D process after deleting the selected one or more computer programs and data associated with the selected one or more computer programs from the volatile memory device.

12. The system of claim 11, wherein the logic configured to perform the S2D process comprises:

logic configured to capture a snapshot of a state of the volatile memory device; and logic configured to store the captured state of the volatile memory device in a designated storage space of a nonvolatile memory device of the system.

13. The system of claim 12, wherein the logic configured to determine whether or not the amount of storage space of the volatile memory device that is currently in use exceeds the preselected TH value is activated upon initiation of entry into the S2D process.

14. The system of claim 12, wherein the logic configured to determine whether or not the amount of storage space of the volatile memory device that is currently in use exceeds the preselected TH value is activated prior to initiation of entry into the S2D process and comprises:

logic configured to determine whether or not one or more conditions indicate that an S2D process will be initiated within the short period of time, and if so, to activate the logic configured to determine whether or not the amount of storage space of the volatile memory device that is currently in use exceeds the preselected TH value.

15. The system of claim 14, wherein said one or more conditions include at least a first condition indicating that it is likely that an ignition of the mobile vehicle will be turned off soon.

16. The system of claim 15, wherein said at least a first condition is met if a determination is made that the mobile vehicle will likely arrive at a target destination within a time period that is less than a preselected TH time period.

17. The system of claim 15, wherein said at least a first condition is met if a determination is made that a speed of the mobile vehicle is less than a preselected TH speed.

18. The system of claim 17, wherein said at least a first condition includes a second condition that is met if a determination is made that the mobile vehicle is at a location that is likely to be a target destination of the mobile vehicle.

19. The system of claim 11, wherein the logic configured to select one or more computer programs that are stored in the volatile memory device for termination comprises:

logic configured to tag computer programs stored in the volatile memory device as either one or more background computer programs or one or more foreground computer programs, and wherein the logic configured to terminate the selected one or more computer programs comprises logic configured to terminate the computer programs that are tagged as background computer programs.

20. The system of claim 19, wherein the foreground computer programs are computer programs that perform at least one of (1) operations or processes that are actively being used by a user of the system, (2) operations or processes that take priority over other tasks being performed by the system, (3) operations or processes that require input from the user, and (4) operations or processes that are essential to the Auto OS, and wherein the background computer programs are computer programs that were formerly foreground computer programs that became background computer programs following execution of the respective foreground computer programs.

21. A computer program for reducing latency in rebooting a system that runs an Automobile Operating System (Auto OS), the system being embedded in a mobile vehicle, the computer program being embodied on a non-transitory computer readable medium and comprising instructions for execution by a processor or controller, the computer program comprising:

a first set of computer instructions for determining, when a movement or location of the mobile vehicle indicates a suspend-to-disk (S2D) process will be initiated and before performing a S2D process, whether or not an amount of storage space of a volatile memory device of the system that is currently in use exceeds a preselected threshold (TH) value;

a second set of computer instructions for selecting one or more computer programs that are stored in the volatile memory device for termination if the amount of storage space of the volatile memory device of the system that is currently in use exceeds the preselected TH value;

a third set of computer instructions for terminating the selected one or more computer programs and deleting the selected one or more computer programs and data associated with the selected one or more computer programs from the volatile memory device; and a fourth set of computer instructions for performing the S2D process after deleting the selected one or more computer programs and data associated with the selected one or more computer programs from the volatile memory device.

22. The computer program of claim 21, wherein the fourth set of computer instructions comprises:

computer instructions for capturing a snapshot of a state of the volatile memory device; and computer instructions for storing the captured state of the volatile memory device in a designated storage space of a nonvolatile memory device of the system.

23. The computer program of claim 22, wherein the first set of computer instructions is performed upon initiation of entry into the S2D process.

24. The computer program of claim 22, wherein the first set of computer instructions is performed prior to initiation of entry into the S2D process and comprises:

computer instructions for determining whether or not one or more conditions indicate that an S2D process will be initiated within the short period of time, and if so, for causing computer instructions to be performed that determine whether or not the amount of storage space of the volatile memory device that is currently in use exceeds the preselected TH value.

25. The computer program of claim 24, wherein said one or more conditions include at least a first condition indicating that it is likely that an ignition of the mobile vehicle will be turned off soon.

26. The computer program of claim 25, wherein said at least a first condition is met if a determination is made that the mobile vehicle will likely arrive at a target destination within a time period that is less than a preselected TH time period.

27. The computer program of claim 25, wherein said at least a first condition is met if a determination is made that a speed of the mobile vehicle is less than a preselected TH speed.

28. The computer program of claim 27, wherein said at least a first condition includes a second condition that is met if a determination is made that the mobile vehicle is at a location that is likely to be a target destination of the mobile vehicle.

29. The computer program of claim 21, wherein the second set of computer instructions for selecting one or more computer programs that are stored in the volatile memory device for termination comprises computer instructions for tagging computer programs stored in the volatile memory devices as either a background computer program or a foreground computer program, and wherein the third set of computer instructions terminates the computer programs that are tagged as background computer programs, wherein the foreground computer programs are computer programs that perform at least one of (1) operations or processes that are actively being used by a user of the system, (2) operations or processes that take priority over other tasks being performed by the system, (3) operations or processes that require input from the user, and (4) operations or processes that are essential to the Auto OS, and wherein the background computer programs are computer programs that were formerly foreground computer programs that became background computer programs following execution of the respective foreground computer programs.

30. A system for reducing latency in rebooting a system that runs an Automobile Operating System (Auto OS), the system being embedded in a mobile vehicle, the system comprising:

means for determining, when a movement or location of the mobile vehicle indicates a suspend-to-disk (S2D) process will be initiated and before performing a S2D process, whether or not an amount of storage space of a volatile memory device of the system that is currently in use exceeds a preselected threshold (TH) value;

means for selecting one or more computer programs that are stored in the volatile memory device for termination if the amount of storage space of the volatile memory device of the system that is currently in use exceeds the preselected TH value;

means for terminating the selected one or more computer programs and for deleting the selected one or more computer programs and data associated with the selected one or more computer programs from the volatile memory device; and means for performing the S2D process after deleting the selected one or more computer programs and data associated with the selected one or more computer programs from the volatile memory device.

* * * * *